(12) United States Patent
Hsu et al.

(10) Patent No.: US 7,875,564 B2
(45) Date of Patent: Jan. 25, 2011

(54) MULTILAYER FIRE-RESISTANT MATERIAL

(75) Inventors: Yeou-Geng Hsu, Hsinchu (TW); Che I. Kao, Hsinchu (TW); Jer-Young Chen, Hsinchu (TW); Yung-Hsing Huang, Taipei (TW); Chih-Ming Hu, Kaohsiung (TW); Sung-Jeng Jong, Pingtung Hsien (TW); Chu-Chun Yu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 266 days.

(21) Appl. No.: 11/984,174

(22) Filed: Nov. 14, 2007

(65) Prior Publication Data

US 2009/0061204 A1 Mar. 5, 2009

Related U.S. Application Data

(63) Continuation-in-part of application No. 11/642,627, filed on Dec. 21, 2006, which is a continuation-in-part of application No. 11/410,913, filed on Apr. 26, 2006, now abandoned.

(30) Foreign Application Priority Data

Dec. 26, 2005 (TW) ............................ 94146503 A
Aug. 31, 2007 (TW) ............................ 96132446 A

(51) Int. Cl.
*B32B 5/02* (2006.01)

(52) U.S. Cl. .................... 442/136; 428/411.1; 428/413; 428/420; 428/920

(58) Field of Classification Search ................ 442/136, 442/69; 428/305.5, 411.1, 688, 413, 420
See application file for complete search history.

(56) References Cited

U.S. PATENT DOCUMENTS

| | | | |
|---|---|---|---|
| 4,405,682 A * | 9/1983 | Fujita et al. | 428/317.7 |
| 5,218,027 A | 6/1993 | Smith et al. | |
| 5,418,272 A * | 5/1995 | Kawabata et al. | 524/436 |
| 5,723,515 A | 3/1998 | Gottfried | |
| 5,998,504 A | 12/1999 | Groth et al. | |
| 6,054,513 A | 4/2000 | Pirig et al. | |
| 6,251,961 B1 | 6/2001 | Pirig et al. | |

(Continued)

FOREIGN PATENT DOCUMENTS

CN 1341141 A 3/2002

(Continued)

OTHER PUBLICATIONS

Chinese Office Action, Appl. No. 200710161978.6, Nov. 1, 2001, pp. 1-5.

*Primary Examiner*—Lynda Salvatore
(74) *Attorney, Agent, or Firm*—Birch, Stewart, Kolasch & Birch, LLP

(57) ABSTRACT

A multilayer fire-resistant material is provided, which comprises two or more layers formed of homogeneous or heterogeneous materials, with at least one layer being an organic/inorganic composite. The organic/inorganic composite comprises an organic component of a polymer, oligomer, or copolymer having a first reactive functional group, and inorganic particles having a second reactive functional group. The inorganic particles are chemically bonded to the organic component via a reaction between the first and the second reactive functional groups.

22 Claims, 5 Drawing Sheets

U.S. PATENT DOCUMENTS

| | | |
|---|---|---|
| 6,262,161 B1 | 7/2001 | Betso et al. |
| 6,673,855 B1 | 1/2004 | Braga et al. |
| 2007/0149675 A1* | 6/2007 | Huang et al. ................ 524/425 |
| 2007/0149676 A1* | 6/2007 | Hu et al. ..................... 524/425 |
| 2007/0149677 A1* | 6/2007 | Huang et al. ................ 524/425 |
| 2007/0179235 A1* | 8/2007 | Huang et al. ................ 524/425 |

FOREIGN PATENT DOCUMENTS

| | | | |
|---|---|---|---|
| DE | 4120833 | A1 | 1/1993 |
| DE | 19715426 | A1 | 10/1998 |
| EP | 0791613 | A1 | 8/1997 |
| TW | 397885 | B | 7/2000 |
| TW | 419514 | B | 1/2001 |
| TW | 442549 | B | 6/2001 |
| TW | 499469 | B | 8/2002 |
| TW | 583078 | B | 4/2004 |
| WO | WO-7900161 | A1 | 4/1979 |

* cited by examiner

MULTILAYER FIRE-RESISTANT MATERIAL

This application is a Continuation-In-Part of application Ser. No. 11/642,627, filed on Dec. 21, 2006, which is a Continuation-In-Part of application Ser. No. 11/410,913, now abandoned, filed on Apr. 26, 2006, which claims priority to Taiwan Patent Application no. 94146503, filed on Dec. 26, 2005. This application also claims priority to Taiwan Patent Application No. 96132446, filed on Aug. 31, 2007.

BACKGROUND OF THE INVENTION

1. Field of the Invention

The invention relates to fire-resistant materials, and in particular, to a multilayer fire-resistant material.

2. Description of the Related Art

Fire resistant or fire retardant materials can be used as architectural or decorative materials. Architectural materials disclosed in Taiwan Patent Nos. 583,078 and 397,885 primarily comprise a stacked layer, serving as a fire resistant layer, made of nonflammable inorganic materials such as pearlite (or perlite), $MgCl_2$, MgO, $CaCO_3$ or cement. In addition, a stiff fire resistant laminate can be obtained from flexible substrates made of fibers or non-wovens blended with flame retardants, foaming agents and 50~80% inorganic materials by weight.

Fire resistant coatings, serving as decorative materials, disclosed in Taiwan Patent Nos. 442,549, 499,469 and 419,514 comprise a combination of foaming and intumescent agents, carbonization agents, flame retardants, and adhesives which foam and intumesce under fire exposure. U.S. Pat. No. 5,723,515 discloses a fire-retardant coating material including a fluid intumescent base material having a foaming agent, a blowing agent, a charring agent, a binding agent, a solvent, and a pigment, for increasing resistance to cracking and shrinking. A compound disclosed by U.S. Pat. No. 5,218,027 is manufactured from a composition of a copolymer or terpolymer, a low modulus polymer, and a synthetic hydrocarbon elastomer. The fire retardant additive comprises a group I, group II or group III metal hydroxide with the proviso where at least 1% by weight of the composition is in the form of an organopolysiloxane. U.S. Pat. No. 6,262,161 relates to filled interpolymer compositions of ethylene and/or alpha-olefin/vinyl or vinylidene monomers, showing improved performance under exposure to flame or ignition sources, and fabricated articles thereof. The articles are often in the form of a film, sheet, a multilayered structure, a floor, wall, or ceiling covering, foams, fibers, electrical devices, or wire and cable assemblies. Conventional flame retardant polymer compositions are obtained by physically blending organic polymer and inorganic flame retardant, wherein coupling agents or surfactants are typically incorporated to improve the dispersity of the inorganic flame retardant. However, because the organic polymer does not react with inorganic component to form a well-structured composite by the formation of chemical bonds, conventional flame retardant compositions easily melts, ignites, or produces flaming drops under exposure to flame or ignition sources.

Specifically, the heated area of the conventional fire resistant material can be carbonized rapidly and expand 8~10 times in volume over the original material size due to foaming, intumescent, and carbonization agents contained therein. However, after long term heating, the intumescent carbonization layer (or the heated part) cracks slightly and peels, such that flame and heat can directly transfer to the interior materials. Accordingly, an improved fire resistant material is desirable.

A fire-resistant organic/inorganic composite is disclosed in detail in commonly assigned U.S. patent application Ser. No. 11/410,913, filed on Apr. 26, 2006, the teachings of which are hereby incorporated by reference. In the organic/inorganic composite, inorganic particles are well dispersed in and reacted with an organic matrix. The inorganic particles strengthen the mechanical properties of the structure through the reaction between inorganic and organic materials, so that a char layer formed on the surface can maintain its structural integrity without peeling or cracking, effectively preventing direct heat transfer to the interior. As a result, the duration of fire resistant ability is tremendously improved.

BRIEF SUMMARY OF THE INVENTION

The invention provides a multilayer fire-resistant material fabricated from organic/inorganic composites. The multilayer structure effectively reduces penetrating cracks or peeling that easily occurs in single layer structures.

The multilayer fire-resistant material of the invention comprises two or more layers formed of homogeneous or heterogeneous materials, with at least one layer being an organic/inorganic composite. The organic/inorganic composite comprises an organic component of a polymer, oligomer, or copolymer having a first reactive functional group and inorganic particles having a second reactive functional group, wherein the inorganic particles are chemically bonded to the organic component via a reaction between the first and the second reactive functional groups.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
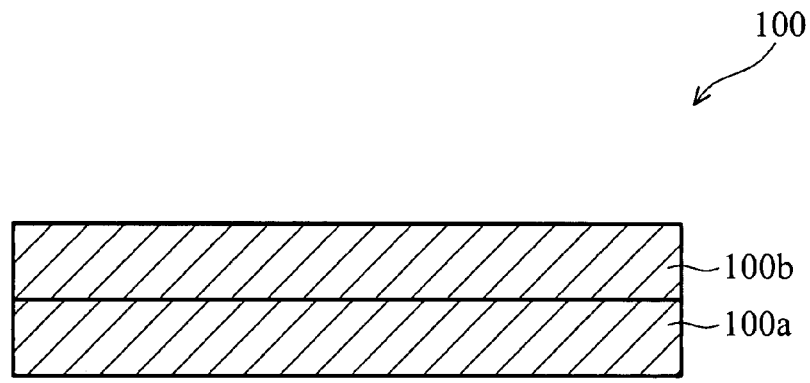
FIG. 1A is a schematic view showing a homogeneous multilayer fire-resistant material according to an embodiment of the invention.

The multilayer fire-resistant material of the invention includes two or more layers formed of homogeneous or heterogeneous materials, wherein at least one layer is formed of an organic/inorganic composite. FIG. 1A shows a homogeneous multilayer fire-resistant material 100 according to an embodiment of the invention, which includes two stacked layers 100a, 100b, both formed of organic/inorganic composites. The organic/inorganic composite used herein comprise inorganic particles well dispersed in and reacted with an organic matrix to enhance the fire retardant and mechanical properties. When the organic/inorganic composite is burned or exposed to fire, the organic component forms a char layer and the inorganic particles radiate to absorb heat. As a well-structured composite is provided by the formation of chemical bonds between the inorganic particles and the organic matrix, the char layer formed on the surface is firm and can maintain its structural integrity without peeling or cracking, effectively preventing direct heat transfer to the interior. A detailed composition of the composite is described later. It should be noted that, the term "homogeneous material" as used herein, is meant to encompass an embodiment where two or more inorganic/organic composite material layers are employed. However, the compositions of these composite layers are not necessarily the same. In other words, these inorganic/organic composite material layers may have different compositional ratios or even different organic/inorganic components. The thickness of the inorganic/organic composite material layer is not particularly limited, but is generally within the range of about 0.5-10 mm, depending on specific applications.

Figure 1B:
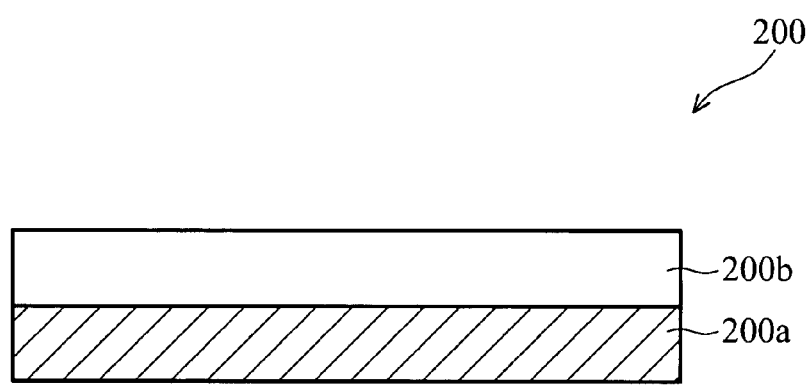
FIG. 1B is a schematic view showing a heterogeneous multilayer fire-resistant material according to another embodiment of the invention.

FIG. 1B shows a heterogeneous multilayer fire-resistant material 200 according to an embodiment of the invention, which includes an organic/inorganic composite material layer 200a and a heterogeneous material layer 200b. As used herein, the term "heterogeneous material" is meant to include any materials other than the organic/inorganic composite. The heterogeneous material may be combustible or incombustible, including for example, steel sheet, steel plate, wood plate, plastic, mineral plate, foam materials, ceramic, textile, or combinations thereof.

The multilayer fire-resistant material 100, 200 of the invention may be directly used in a plate form or applied on an object surface by coating, adhering, or any suitable fixtures.

Although FIGS. 1A-1B shows a two-layered structure, an embodiment of the invention may be implemented in three layers or more by compression molding, multiple coating, or the like. For example, in FIG. 1A, one or more layers of organic/inorganic composite material may be additionally disposed on the layer 100a and/or 100b. Further, in FIG. 1B, one or more heterogeneous or homogeneous layers may be additionally disposed on the layer 200a and/or 200b. Moreover, while the multilayer structure in FIGS. 1A-1B is presented as a film or plate, it is understood that the multilayer fire-resistant material of the invention may also be presented in a tubular form.

The detailed compositions and fabrication methods of the organic/inorganic composite material are now described. In the invention, inorganic particles having reactive functional groups, originally or after surface modification, are well dispersed in and reacted with an organic component such as polymer, monomer, oligomer, prepolymer, or copolymer to enhance the fire resistant and mechanical properties. In general, the organic/inorganic composite may comprise 10-90% by weight of the organic component, and 90-10% by weight of the inorganic particle. Preferably, the organic/inorganic composite comprises 30-70% by weight of the organic component, and 70-30% by weight of the inorganic particle, and more preferably 40-60% by weight of the organic component, and 60-40% by weight of the inorganic particle.

The organic component in the resulting composite may comprise polymer, copolymer or oligomer. For the purposes of the invention, the term "polymer" or "copolymer" refers to compounds having number average molecular weights in the range from 1500 to over 1,00,000 Daltons, while "oligomer" refers to compounds having number average molecular weights in the range of from 200 to 1499 Daltons.

The reactive functional groups of the organic component and inorganic particles include, but are not limited to, —OH, —COOH, —NCO, —NH$_2$, —NH, and epoxy groups. For example, an organic component having —COOH or —NCO groups (e.g., organic acid or reactive polyurethane) can be employed to react with inorganic particles having —OH groups (e.g., metal hydroxide). In addition, an organic component having epoxy groups can be employed to react with inorganic particles having —NH$_2$ groups. Alternatively, an organic component having —OH groups (e.g., polyvinyl alcohol) may react with inorganic particles having —COOH or —NCO groups, and an organic component having —NH$_2$ groups may react with inorganic particles having epoxy groups.

Organic components suitable for use herein include any monomer, oligomer, monopolymer, copolymer, or prepolymer that contains the above-mentioned reactive functional groups. The reactive functional groups may reside in a backbone or side chain of the polymer. Preferred organic components include polyorganic acid, polyurethane, epoxy, polyolefin, and polyamine. The polyorganic acid includes monopolymers or copolymers that contain carboxylic or sulfonic acids such as poly(ethylene-co-acrylic acid) and poly(acrylic acid-co-maleic acid). Illustrative examples of epoxy include bis(3,4-epoxy-6-methylcyclohexylmethyl) adipate, vinylcyclohexene dioxide, diglycidyl tetrahydrophthalate, diglycidyl hexahydrophthalate, bis(2,3-epoxycyclopentyl) ether resin, and glycidyl ethers of polyphenol epoxy resin. Polyamines suitable for use include polyamine and polyimide. Illustrative examples of polyamine include nylon 6 ((NH(CH$_2$)$_5$CO)$_n$), nylon 66 ((NH(CH$_2$)$_6$—NH—CO(CH$_2$)$_4$CO)$_n$), and nylon 12 ((NH(CH$_2$)$_5$CO)$_n$). The polyimide includes diamine such as 4,4-oxydianiline, 1,4-bis(4-aminophenoxy)benzene, or 2,2-bis[4-(4-aminophenoxy)phenyl]propane, and also includes polyimide synthesized by the diamine and dianhydride such as oxydiphthalic anhydride, pyromellitic dianhydride, or benzophenone tetracarboxylic dianhydride. Polyolefins suitable for use include copolymers of an olefin monomer and a monomer having the above reactive functional groups. It should be noted that starting materials for the organic component also includes monomer, oligomer, copolymer and prepolymer of the above illustrative polymers. In addition, the organic components may be used alone or in admixture of two or more.

Inorganic particles suitable for use herein are those having corresponding functional groups, originally or after surface modification, that can react with the functional groups of the organic component. Preferred inorganic particles include hydroxide, nitride, oxide, carbide, metal salt, and inorganic layered material. Suitable hydroxides include metal hydroxide such as $Al(OH)_3$ or $Mg(OH)_2$. Suitable nitrides include, for example, BN and $Si_3N_4$. Suitable oxides include, for example, $SiO_2$, $TiO_2$, and ZnO. Suitable carbides include, for example, SiC. Suitable metal salts include, for example, $CaCO_3$. Suitable inorganic layered materials include, for example, clay, talc, and layered double hydroxide (LDH), wherein the clay can be smectite clay, vermiculite, halloysite, sericite, saponite, montmorillonite, beidellite, nontronite, mica, or hectorite. The inorganic particles can also be used in admixture of two or more. For example, clay having reactive functional groups can be used in combination with metal hydroxide. Suitable inorganic particles include micro-sized particles and nano-sized particles. Nano-sized particles having diameters between 1 and 100 nm are particularly preferred because the smaller the particle size the greater the surface area per unit weight.

The organic component and the inorganic particles can be directly mixed for reaction to form covalent bonds or ionic bonds, or the reaction can be carried out in various solvates (e.g., water, ethanol, or methyl ethyl ketone). The reaction temperature is generally from room temperature to about 150° C. and the reaction time may vary from 10 minutes to few days, depending on the starting materials used. The organic polymer containing reactive functional groups (such as R—NCO, where R represents carbon chains) on main chains is mixed with solvents (such as water, alcohol, or MEK). Subsequently, inorganic particles with corresponding reactive functional groups (such as M-OH, where M represents metal) are added to the polymer solution, and the mixture is stirred at 70-90° C. for 20 minutes to several hours till the reaction has completed. The slurry of $R-NHCOO^-M^+$ is produced by means of the reaction between R—NCO of the polymer and M-OH of the inorganic particles, where R represents carbon chains and M represents metal.

The above slurry may be fabricated into multilayer structures by any suitable methods. For example, the slurry may be coated to form a first layer of a predetermined thickness, and then a second layer is coated on the surface of the first layer after it is partially or completely cured. The coating procedure can be repeated until the desired multilayer structure is formed. Each layer may have the same or different thickness. In addition, the slurry may be molded into films, plates, or tubes by compression molding, injection molding, extrusion molding, or calendar molding. Taking compression molding as an example, the slurry is first molded into the intended final forms such as films, plates, or tubes, and the first molded component is used as a substrate for the subsequent molding. Thus, a multilayer structure can be obtained by multiple molding. Materials other than the organic/inorganic composite slurry may be employed during the coating or molding procedure to provide a heterogeneous multilayer fire-resistant material. Depending on the specific application, the heterogeneous materials may be combustible or incombustible, including steel sheet, steel plate, wood plate, plastic, mineral plate, foam materials, ceramic, textile, or combinations thereof. In one example, the organic/inorganic composite material is used in combination with a foam material to provide a sound-proof fire-resistant material. In another example, the organic/inorganic composite material is used in combination with textile to provide a fire-resistant curtain, fire-resistant blanket, or heat-resistant glove. In a further example, the organic/inorganic composite material is used in combination with a mineral plate to provide a spacer plate.

Accordingly, those of ordinary skill in the art may incorporate various additives depending on the specific application. For example, flame retardant such as melamine, melamine phosphates, red phosphorus, phosphorus-based flame retardant, nitrogen-based flame retardant, or phosphorus-nitrogen based flame retardant may be present to improve the flame retardancy. Silanes such as tetraethoxysilane (TEOS) or triethoxyvinylsilane (TEVS) or siloxane may be present to strengthen structural integrity and facilitate curing. Glass sand and glass fiber may be present to improve the heat resistance and strengthen structural integrity. The amount of these additives is typically between 0.1 and 20 parts by weight, based on 100 parts by weight of the organic/inorganic composite.

When the multilayer fire-resistant material of the invention is burned or exposed to fire, the organic component of the composite forms a char layer and the inorganic particles radiate to absorb heat. The inorganic particles also strengthen the mechanical properties of the structure through the reaction between inorganic and organic materials. Furthermore, with the aid of the multilayer structure, the formed char layer remains firm and structural integrity thereof is preserved without penetrating cracks or peeling, effectively preventing direct transfer of heat to the interior of the object. As a result, the duration of fire resistant ability is greatly improved when compared to the single-layer or other commercially available fire-resistant materials.

Without intending to limit the invention in any manner, the present invention will be further illustrated by the following examples.

Comparative Examples 1-3

32.0 g of aliphatic polyisocyanate containing 8% reactive isocyanate groups and 8.0 g of aromatic polyisocyanate containing 30-32% reactive isocyanate groups (3913BD from Nan Pao Resins) were charged in a reactor, and stirred at 300 rpm at room temperature. Subsequently, 60 g of aluminum hydroxide powder (H42M from Showa Denko K. K.) was added to the reactor, providing a light yellow slurry after stirring for 5 minutes. A 2 mm, 4 mm, and 6 mm-thick slurry was respectively coated on a teflon release paper, dried at room temperature for 24 hours, and then cured in an oven at 80° C. for 24 hours. The cured coating was removed from the release paper, thus proving a light yellow 2 mm-thick plate (Comparative Example 1), 4 mm-thick plate (Comparative Example 2), and 6 mm-thick plate (Comparative Example 3), respectively.

Figure 2:
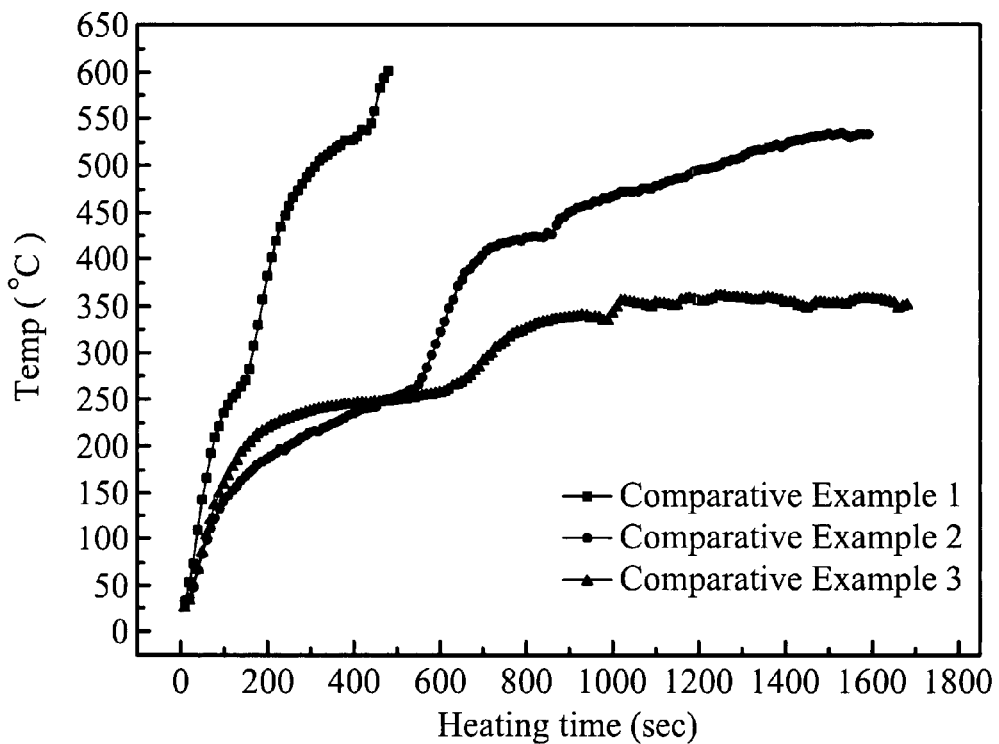
FIG. 2 is a diagram showing the backside temperature of the single layer plates with varying thicknesses as a function of heating time of Comparative Examples 1-3.

A flame test was conducted on the surface of the plates by butane gas torch with flame temperature of 1000-1200° C., where the bottom surface of the plates was connected to thermocouple of a temperature detector to monitor temperature rise. As shown in FIG. 2, the temperature under the 2 mm-thick plate increased to 260° C. after heating for 3 minutes. After heating for 4 minutes, the 2 mm-thick plate became deformed, cracked, and the temperature increased rapidly to above 500° C. after 5 minutes. In the case of 4 mm-thick plate, the temperature increased at a slower rate, reaching 250° C. after 10 minutes, and reaching 520° C. after 25 minutes. In the case of 6 mm-thick plate, the temperature increased even slower, only reaching 350° C. after 25 minutes. However, the 4 mm and 6 mm-thick plates became seriously cracked after heating for 10-15 minutes. Moreover, penetrating cracks were observed on the plates, which may result in direct transfer of heat to the interior and greatly reduce the duration of fire resistant ability at the fire site.

Example 1

32.0 g of aliphatic polyisocyanate containing 8% reactive isocyanate groups and 8.0 g of aromatic polyisocyanate containing 30-32% reactive isocyanate groups (3913BD from Nan Pao Resins) were charged in a reactor, and stirred at 300 rpm at room temperature. Subsequently, 60 g of aluminum hydroxide powder (H42M from Showa Denko K. K.) was added to the reactor, providing a light yellow slurry after stirring for 5 minutes. A 2 mm-thick slurry was coated on a teflon release paper, dried at room temperature for 24 hours, and then another 2 mm-thick slurry was coated on the dried sample, which was further dried at room temperature for 24 hours, and finally cured in an oven at 80° C. for 24 hours. The cured sample was removed from the release paper, thus providing a light yellow 4 mm-thick bilayer plate. The bilayer plate was placed on a piece of A4 size paper. A flame test was conducted on the surface of the bilayer plate by butane gas torch with flame temperature of 1000-1200° C. for 30-180 seconds. No scorching was observed on the piece of A4 size paper after heating for 30, 60, 120, and 180 seconds.

According to this example, the sample not only met UL94-V0 fire retardant standards, but also the duration of fire resistance at 1000-1200° C. was more than 3 minutes due to the strengthened sample layer, i.e. R—NCO of polyisocyanate reacted with —OH groups of $Al(OH)_3$ to form chemical bonds rather than physical blending.

Figure 3:
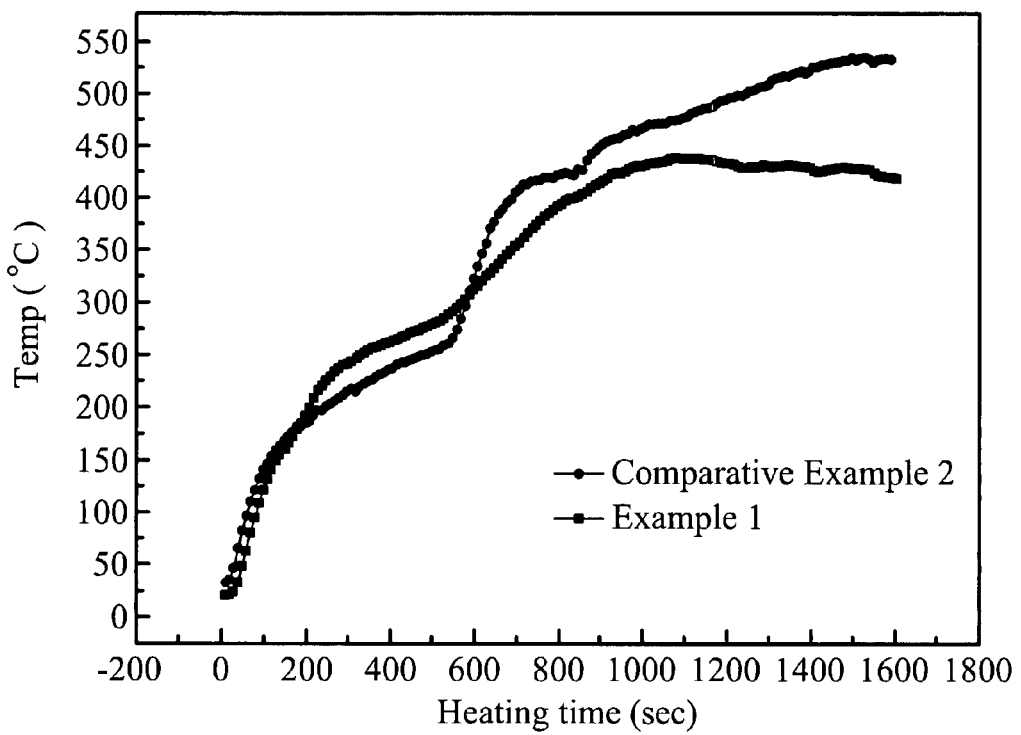
FIG. 3 is a diagram showing the backside temperature of the 4 mm-thick multilayer plate of Example 1 as a function of heating time, compared to the single layer counterpart of Comparative Example 2.

A flame test was conducted on the surface of the bilayer plate by butane gas torch with flame temperature of 1000-1200° C., where the bottom surface of the plate was connected to thermocouple of a temperature detector to monitor temperature rise. The test results of the 4 mm-thick bilayer plate and the single layer counterpart of Comparative Example 2 are compared in FIG. 3. As shown in FIG. 3, the temperature under the 4 mm-thick bilayer plate increased to about 180° C. after heating for 200 seconds, with a temperature increase curve similar with the single layer plate. During the heating period of 200-600 seconds, the backside temperature of the bilayer plate was slightly higher than that of the single layer plate by 20-30° C. After 10 minutes, the backside of the bilayer plate gradually reached a balanced temperature of about 420° C. and stopped increasing thereafter. In comparison, the backside temperature of the single layer plate continued to increase to over 500° C. due to the presence of penetrating cracks.

Although cracks were still found on the surface of the bilayer plate after heating for 15 minutes, it did not expand to a greater extent. Moreover, cracks did not penetrate through the sample as in the single layer plate. The result indicates that the tendency to crack was reduced by the multilayer structure. Accordingly, the multilayer structure can effectively prevent direct heat transfer to the interior by preserving structural integrity, with the duration of fire resistance ability significantly extended as a result.

Example 2

32.0 g of aliphatic polyisocyanate containing 8% reactive isocyanate groups and 8.0 g of aromatic polyisocyanate containing 30-32% reactive isocyanate groups (3913BD from Nan Pao Resins) were charged in a reactor, and stirred at 300 rpm at room temperature. Subsequently, 60 g of aluminum hydroxide powder (H42M from Showa Denko K. K.) was added to the reactor, providing a light yellow slurry after stirring for 5 minutes. A 3 mm-thick slurry was coated on a teflon release paper, dried at room temperature for 24 hours, and then another 3 mm-thick slurry was coated on the dried sample, which was further dried at room temperature for 24 hours, and finally cured in an oven at 80° C. for 24 hours. The cured sample was removed from the release paper, thus providing a light yellow 6 mm-thick bilayer plate. The bilayer plate was placed on a piece of A4 size paper. A flame test was conducted on the surface of the bilayer plate by butane gas torch with flame temperature of 1000-1200° C. for 30-180 seconds. No scorching was observed on the piece of A4 size paper after heating for 30, 60, 120, and 180 seconds.

According to this example, the sample not only met UL94-V0 fire retardant standards, but also the duration of fire resistance at 1000-1200° C. was more than 3 minutes due to the strengthened sample layer, i.e. R—NCO of polyisocyanate reacted with —OH groups of $Al(OH)_3$ to form chemical bonds rather than physical blending.

Figure 4:
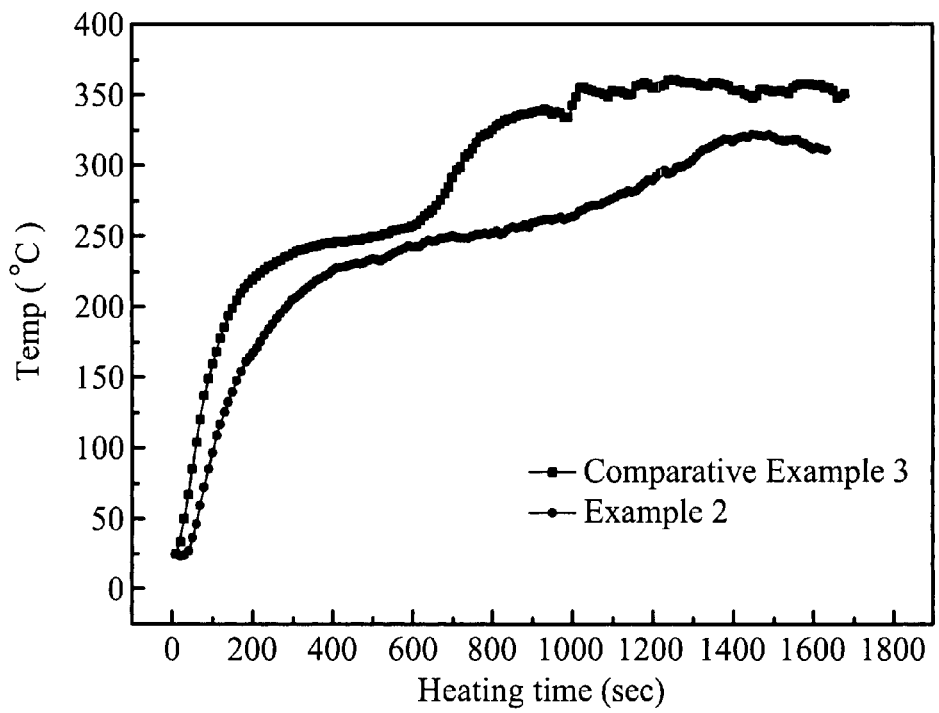
FIG. 4 is a diagram showing the backside temperature of the 6 mm-thick multilayer plate of Example 2 as a function of heating time, compared to the single layer counterpart of Comparative Example 3.

A flame test was conducted on the surface of the bilayer plate by butane gas torch with flame temperature of 1000-1200° C., where the bottom surface of the plate was connected to thermocouple of a temperature detector to monitor temperature rise. The test results of the 6 mm-thick bilayer plate and the single layer counterpart of Comparative Example 3 are compared in FIG. 4. As shown in FIG. 4, the temperature increase curves of the two plates were similar within 600 seconds, with the bilayer plate about 20-50° C. lower. During the heating period of 600-800 seconds, the backside temperature of the single layer plate increased abruptly to 330° C. In comparison, the backside of the bilayer plate gradually increased to 310° C. after 1400 seconds, and maintained a balanced temperature of about 290-300° C. thereafter, which was about 50-60° C. lower when compared to the single layer counterpart with penetrating cracks. Accordingly, the multilayer structure can effectively prevent direct heat transfer to the interior by preserving structural integrity, with the duration of fire resistance ability significantly extended as a result.

Example 3

32.0 g of aliphatic polyisocyanate containing 8% reactive isocyanate groups and 8.0 g of aromatic polyisocyanate containing 30-32% reactive isocyanate groups (3913BD from Nan Pao Resins) were charged in a reactor, and stirred at 300 rpm at room temperature. Subsequently, 60 g of aluminum hydroxide powder (H42M from Showa Denko K. K.) was added to the reactor, providing a light yellow slurry after stirring for 5 minutes. A 3 mm-thick slurry was coated on a 3 mm-thick calcium silicate plate (ECC 561), dried at room temperature for 24 hours, and then cured in an oven at 80° C. for 24 hours, thus providing a light yellow 6 mm-thick bilayer heterogeneous plate. The bilayer plate was placed on a piece of A4 size paper. A flame test was conducted on the surface of the bilayer plate by butane gas torch with flame temperature of 1000-1200° C. for 30-180 seconds. No scorching was observed on the piece of A4 size paper after heating for 30, 60, 120, and 180 seconds.

According to this example, the sample not only met UL94-V0 fire retardant standards, but also the duration of fire resistance at 1000-1200° C. was more than 3 minutes due to the strengthened sample layer, i.e. R—NCO of polyisocyanate reacted with —OH groups of $Al(OH)_3$ to form chemical bonds rather than physical blending.

Figure 5:
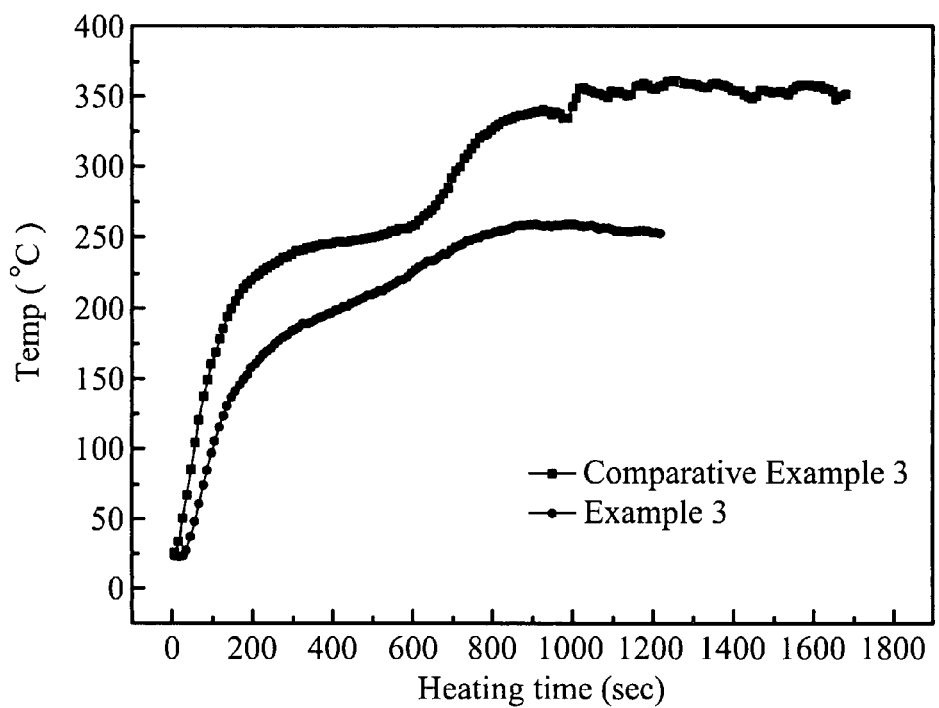
FIG. 5 is a diagram showing the backside temperature of the 6 mm-thick multilayer plate of Example 3 as a function of heating time, compared to the single layer counterpart of Comparative Example 3.

A flame test was conducted on the surface of the bilayer composite plate by butane gas torch with flame temperature of 1000-1200° C., where the bottom surface of the plate was connected to thermocouple of a temperature detector to monitor the temperature rise. The test results of the 6 mm-thick bilayer composite plate and the single layer counterpart of Comparative Example 3 are compared in FIG. 5. As shown in FIG. 5, the temperature increase curves of the two plates are similar within 20 minutes, with the bilayer plate about 50-100° C. lower. Thereafter, the backside temperature of the bilayer composite plate maintained at about 250° C., while that of the single layer plate continued to increase. Accordingly, the multilayer structure can effectively prevent direct heat transfer to the interior by preserving structural integrity, with the duration of fire resistance ability significantly extended as a result.

Example 4

32.0 g of aliphatic polyisocyanate containing 8% reactive isocyanate groups and 8.0 g of aromatic polyisocyanate containing 30-32% reactive isocyanate groups (3913BD from Nan Pao Resins) were charged in a reactor, and stirred at 300 rpm at room temperature. Subsequently, 60 g of aluminum hydroxide powder (H42M from Showa Denko K. K.) was added to the reactor, providing a light yellow slurry after stirring for 5 minutes. A 2 mm-thick slurry was coated on a 1 mm-thick stainless steel plate, dried at room temperature for 24 hours, and then cured in an oven at 80° C. for 24 hours, thus providing a light yellow 3 mm-thick bilayer heterogeneous plate. The bilayer plate was placed on a piece of A4 size paper. A flame test was conducted on the surface of the bilayer plate by butane gas torch with flame temperature of 1000-1200° C. for 30-180 seconds. No scorching was observed on the piece of A4 size paper after heating for 30, 60, 120, and 180 seconds.

According to this example, the sample not only met UL94-V0 fire retardant standards, but also the duration of fire resistance at 1000-1200° C. was more than 3 minutes due to the strengthened sample layer, i.e. R—NCO of polyisocyanate reacted with —OH groups of $Al(OH)_3$ to form chemical bonds rather than physical blending.

Figure 6:
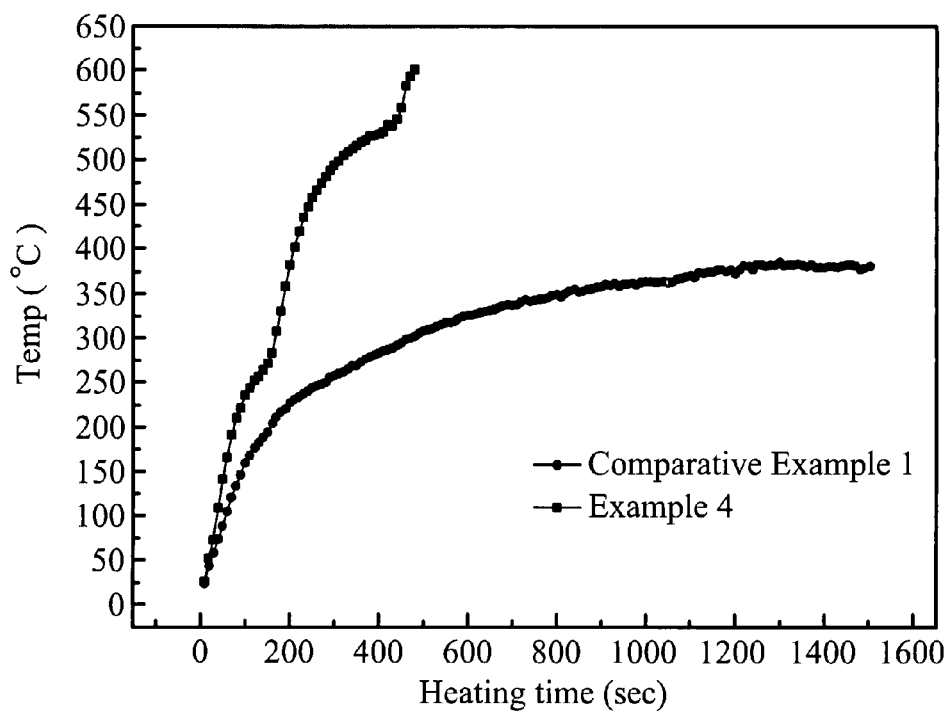
FIG. 6 is a diagram showing the backside temperature of the 3 mm-thick multilayer plate of Example 4 as a function of heating time, compared to the 2 mm-thick single layer plate of Comparative Example 3.

A flame test was conducted on the surface of the bilayer plate by butane gas torch with flame temperature of 1000-1200° C., where the bottom surface of the plate was connected to thermocouple of a temperature detector to monitor the temperature rise. The test results of the 3 mm-thick bilayer plate and the 2 mm-thick single layer plate of Comparative Example 1 are compared in FIG. 6. As shown in FIG. 6, the backside temperature of the 3 mm-thick bilayer composite plate increased gradually to about 370° C. after 25 minutes, while that of the 2 mm-thick single layer plate increased abruptly due to penetrating cracks. Accordingly, the multilayer structure can effectively prevent direct heat transfer to the interior by preserving structural integrity, with duration of fire resistance ability significantly extended as a result.

Example 5

32.0 g of aliphatic polyisocyanate containing 8% reactive isocyanate groups and 8.0 g of aromatic polyisocyanate containing 30-32% reactive isocyanate groups (3913BD from Nan Pao Resins) were charged in a reactor, and stirred at 300 rpm at room temperature. Subsequently, 60 g of aluminum hydroxide powder (H42M from Showa Denko K. K.) was added to the reactor, providing a light yellow slurry S-1 after stirring for 5 minutes. A 2 mm-thick slurry S-1 was coated on a teflon release paper, and dried at room temperature for 24 hours, thus providing a light yellow 2 mm-thick plate.

32.0 g of aliphatic polyisocyanate containing 8% reactive isocyanate groups and 8.0 g of aromatic polyisocyanate containing 30-32% reactive isocyanate groups (3913BD from Nan Pao Resins) were charged in a reactor, and stirred at 300 rpm at room temperature. Subsequently, 40 g of aluminum hydroxide powder (H42M from Showa Denko K. K.) and 20 g of melamine were added to the reactor, providing a light yellow slurry S-2 after stirring for 5 minutes. A 2 mm-thick slurry S-2 was coated on the 2 mm-thick plate formed from the slurry S-1, and dried at room temperature for 24 hours, thus providing a 4 mm-thick bilayer plate.

32.0 g of aliphatic polyisocyanate containing 8% reactive isocyanate groups and 8.0 g of aromatic polyisocyanate containing 30-32% reactive isocyanate groups (3913BD from Nan Pao Resins) were charged in a reactor, and stirred at 300 rpm at room temperature. Subsequently, 40 g of aluminum hydroxide powder (H42M from Showa Denko K. K.), 3 g of melamine, 16 g of ammonium polyphosphate (APP), and 1 g of pentaerythritol were added to the reactor, providing a light yellow slurry S-3 after stirring for 5 minutes. A 2 mm-thick slurry S-3 was coated on the above 4 mm-thick bilayer plate, dried at room temperature for 24 hours, and cured in an oven at 80° C. for 24 hours, thus providing a 6 mm-thick trilayer plate.

The trilayer plate was placed on a piece of A4 size paper. A flame test was conducted on the surface of the trilayer plate by butane gas torch with flame temperature of 1000-1200° C. for 30-180 seconds. No scorching was observed on the piece of A4 size paper after heating for 30, 60, 120, and 180 seconds.

According to this example, the sample not only met UL94-V0 fire retardant standards, but also the duration of fire resistance at 1000-1200° C. was more than 3 minutes due to the strengthened sample layer, i.e. R—NCO of polyisocyanate reacted with —OH groups of $Al(OH)_3$ to form chemical bonds rather than physical blending.

Figure 7:
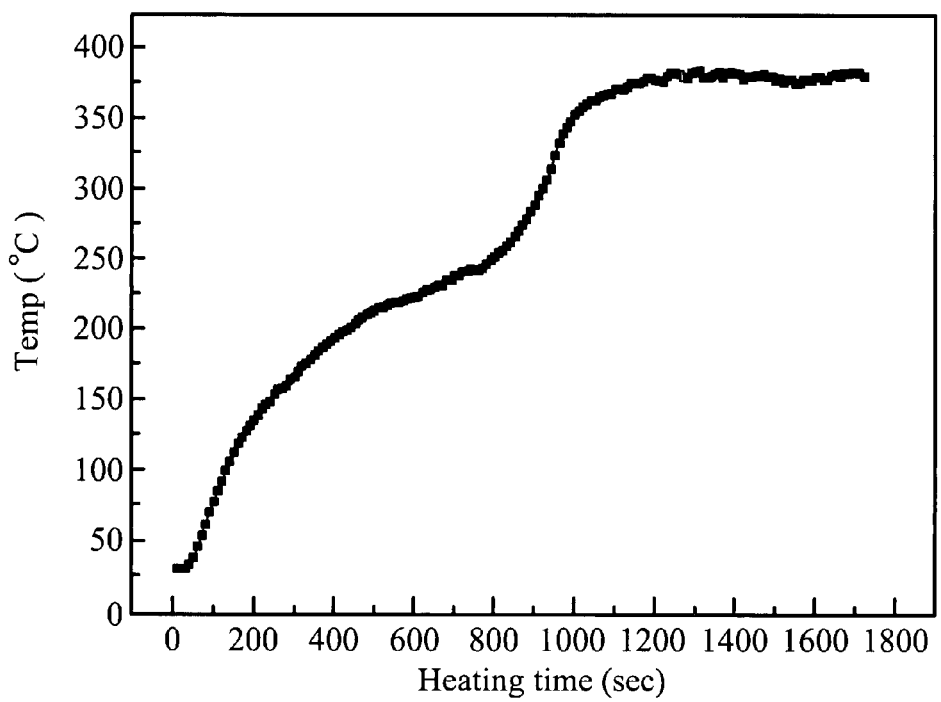
FIG. 7 is a diagram showing the backside temperature of the 6 mm-thick multilayer plate of Example 5 as a function of heating time.

A flame test was conducted on the surface of the bilayer plate by butane gas torch with flame temperature of 1000-1200° C., where the bottom surface of the plate was connected to thermocouple of a temperature detector to monitor the temperature rise. As shown in FIG. 7, the backside temperature of the 3 mm-thick trilayer plate increased gradually to about 380° C. after heating for 25 minutes owing to inhibition of penetrating crack. Accordingly, the multilayer structure can effectively prevent direct heat transfer to the interior by preserving structural integrity, with the duration of fire resistance ability significantly extended as a result.

Example 6

32.0 g of aliphatic polyisocyanate containing 8% reactive isocyanate groups and 8.0 g of aromatic polyisocyanate containing 30-32% reactive isocyanate groups (3913BD from Nan Pao Resins) were charged in a reactor, and stirred at 300 rpm at room temperature. Subsequently, 60 g of aluminum hydroxide powder (H42M from Showa Denko K. K.) was added to the reactor, providing a light yellow slurry after stirring for 5 minutes. A 2 mm-thick slurry was coated on a 3 mm-thick wood plate, and then a 2 mm-thick stainless steel plate was placed on the slurry, dried at room temperature for 24 hours, and cured in an oven at 80° C. for 24 hours, thus providing a 7 mm-thick trilayer heterogeneous plate.

Figure 8:
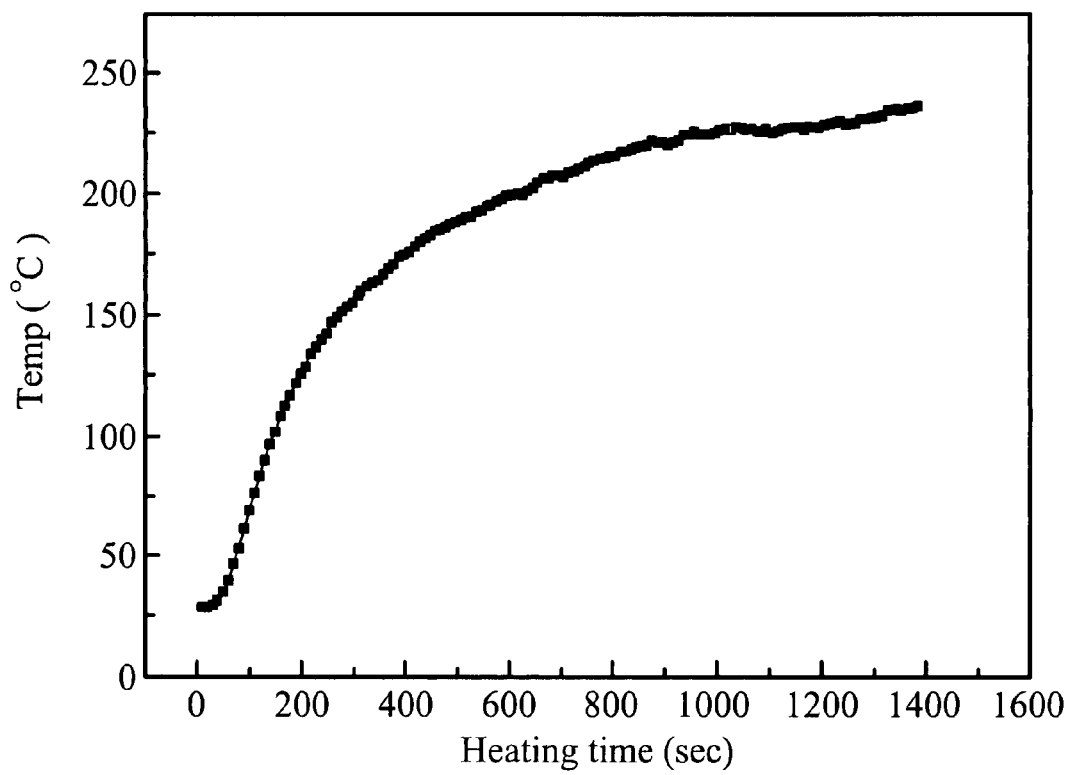
FIG. 8 is a diagram showing the backside temperature of the 7 mm-thick multilayer plate of Example 6 as a function of heating time.

A flame test was conducted on the wood surface of the trilayer heterogeneous plate by butane gas torch with flame temperature of 1000-1200° C., where the stainless steel surface of the plate was connected to thermocouple of a temperature detector to monitor the temperature rise. The burn penetrated through the wood plate within one minute. However, the intermediate organic-inorganic composite layer remained its structural integrity during the burn. In the absence of penetrating cracks, direct transfer of heat to the backside stainless steel plate was prevented. As shown in FIG. 8, the backside temperature of stainless steel plate only increased to about 230° C. after 20 minutes due to inhibition of penetrating cracks. Accordingly, the multilayer structure showed improved fire resistance over the single layer counterpart, with the duration of fire resistance ability significantly extended as a result.

Example 7

32.0 g of aliphatic polyisocyanate containing 8% reactive isocyanate groups and 8.0 g of aromatic polyisocyanate containing 30-32% reactive isocyanate groups (3913BD from Nan Pao Resins) were charged in a reactor, and stirred at 300 rpm at room temperature. Subsequently, 30 g of aluminum hydroxide powder (H42M from Showa Denko K. K.) and 30 g of magnesium hydroxide powder (FR-20-100D-S10A from ICL Industrial Products) were added to the reactor, providing a light yellow slurry after stirring for 5 minutes. A 2.5 mm-thick slurry was coated on a teflon release paper, and dried at room temperature for 24 hours. Another 2.5 mm-thick slurry was coated on the dried coating, dried at room temperature for 24 hours, and then cured in an oven at 80° C. for 24 hours. The cured coating was removed from the release paper, thus providing a light yellow 5 mm-thick bilayer plate. The bilayer plate was placed on a piece of A4 size paper. A flame test was conducted on the surface of the bilayer plate by butane gas torch with flame temperature of 1000-1200° C. for 30-180 seconds. No scorching was observed on the piece of A4 size paper after heating for 30, 60, 120, and 180 seconds.

According to this example, the sample not only met UL94-V0 fire retardant standards, but also the duration of fire resistance at 1000-1200° C. was more than 3 minutes due to the strengthened sample layer, i.e. —NCO group of polyisocyanate reacted with —OH groups of $Al(OH)_3$ and $Mg(OH)_2$ to form chemical bonds rather than physical blending.

Figure 9:
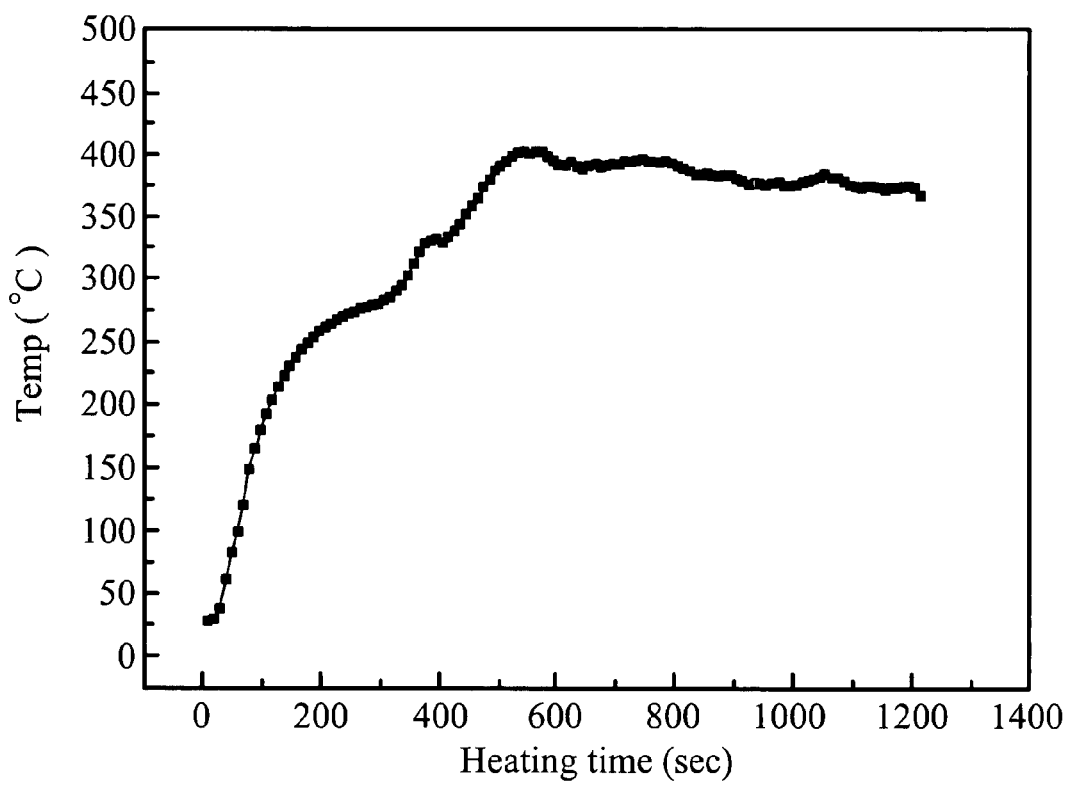
FIG. 9 is a diagram showing the backside temperature of the 5 mm-thick multilayer plate of Example 7 as a function of heating time.

A flame test was conducted on the surface of the bilayer plate by butane gas torch with flame temperature of 1000-1200° C., where the bottom surface of the plate was connected to thermocouple of a temperature detector to monitor the temperature rise. As shown in FIG. 9, the backside temperature of the 5 mm-thick bilayer plate increased gradually to about 250° C. after heating for 200 seconds. During the heating period of 200-600 seconds, the backside temperature reached about 400° C. After heating for 10 minutes, the backside temperature stopped increasing and reached a balanced temperature of about 370-390° C. No penetrating cracks were observed. Accordingly, the multilayer structure can effectively prevent direct heat transfer to the interior by preserving structural integrity, with the duration of fire resistance ability significantly extended as a result.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multilayer fire-resistant material, comprising:
   two or more layers formed of homogeneous or heterogeneous materials, with at least one layer being an organic/inorganic composite;
   wherein the organic/inorganic composite comprises:
   an organic component of a polymer, oligomer, or copolymer having a first reactive functional group of isocyanate, epoxy, hydroxyl or amino; and
   inorganic particles having a second reactive functional group of hydroxyl, amino, carboxylic acid, isocyanate, or epoxy;
   wherein the inorganic particles are chemically bonded to the organic component via a reaction between the first and the second reactive functional groups, provided that
   (a) when the first reactive functional group is isocyanate, the second reactive functional group is hydroxyl;
   (b) when the first reactive functional group is epoxy, the second reactive functional group is amino;
   (c) when the first reactive functional group is hydroxyl, the second reactive functional group is carboxylic acid or isocyanate; and
   (d) when the first reactive functional group is amino, the second reactive functional group is epoxy.

2. The multilayer fire-resistant material as claimed in claim 1, wherein the two or more layers are formed of heterogeneous materials.

3. The multilayer fire-resistant material as claimed in claim 1, where the two or more layers are formed of homogeneous materials.

4. The multilayer fire-resistant material as claimed in claim 1, wherein the heterogeneous materials are combustible materials.

5. The multilayer fire-resistant material as claimed in claim 1, wherein the heterogeneous materials are incombustible materials.

6. The multilayer fire-resistant material as claimed in claim 1, wherein the heterogeneous materials comprise steel sheet, steel plate, wood plate, plastic, mineral plate, foam materials, ceramic, textile, or combinations thereof.

7. The multilayer fire-resistant material as claimed in claim 1, wherein the heterogeneous materials comprise a foam material to provide a sound-proof fire-resistant material.

8. The multilayer fire-resistant material as claimed in claim 1, wherein the heterogeneous materials comprise textile to provide a fire-resistant curtain, fire-resistant blanket, or heat-resistant glove.

9. The multilayer fire-resistant material as claimed in claim 1, wherein the heterogeneous materials comprise a mineral plate to provide a spacer plate.

10. The multilayer fire-resistant material as claimed in claim 1, wherein the organic/inorganic composite comprises 10-90% by weight of the organic component, and 90-10% by weight of the inorganic particles.

11. The multilayer fire-resistant material as claimed in claim 1, wherein the first reactive functional group is isocyanate, and the second reactive functional group is hydroxyl.

12. The multilayer fire-resistant material as claimed in claim 1, wherein the first reactive functional group is epoxy, and the second reactive functional group is amino.

13. The multilayer fire-resistant material as claimed in claim 1, wherein the first reactive functional group is hydroxyl, and the second reactive functional group is carboxylic acid or isocyanate.

14. The multilayer fire-resistant material as claimed in claim 1, wherein the first reactive functional group is amino, and the second reactive functional group is epoxy.

15. The multilayer fire-resistant material as claimed in claim 1, wherein the organic component comprises polyacid, polyurethane, epoxy, polyolefin, or polyamine.

16. The multilayer fire-resistant material as claimed in claim 1, wherein the inorganic particles comprise hydroxide, nitride, oxide, carbide, metal salt, or inorganic layered material.

17. The multilayer fire-resistant material as claimed in claim 1, wherein the hydroxide comprises metal hydroxide.

18. The multilayer fire-resistant material as claimed in claim 1, wherein the metal hydroxide comprises $Al(OH)_3$ or $Mg(OH)_2$.

19. The multilayer fire-resistant material as claimed in claim 1, further comprising an additive.

20. The multilayer fire-resistant material as claimed in claim 1, wherein the additive comprises melamine, phosphorus based flame retardant, nitrogen based flame retardant, or phosphorus-nitrogen based flame retardant.

21. The multilayer fire-resistant material as claimed in claim 1, wherein the additive comprises glass fiber or glass sand.

22. The multilayer fire-resistant material as claimed in claim 1, wherein the additive comprises alkoxysilane or siloxane.

* * * * *